US012769998B2

(12) United States Patent
Lee et al.

(10) Patent No.: US 12,769,998 B2
(45) Date of Patent: Oct. 20, 2026

(54) METHOD AND SYSTEM FOR TRAINING DYNAMIC DEEP NEURAL NETWORK

(71) Applicant: ELECTRONICS AND TELECOMMUNICATIONS RESEARCH INSTITUTE, Daejeon (KR)

(72) Inventors: Su Woong Lee, Daejeon (KR); Seungjae Lee, Daejeon (KR); Jong-Gook Ko, Daejeon (KR); Wonyoung Yoo, Daejon (KR); Jung Jae Yu, Daejeon (KR); Keun Dong Lee, Daejeon (KR); Yongsik Lee, Daejeon (KR); Da-Un Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1342 days.

(21) Appl. No.: 17/554,870

(22) Filed: Dec. 17, 2021

(65) Prior Publication Data

US 2022/0222525 A1 Jul. 14, 2022

(30) Foreign Application Priority Data

Jan. 12, 2021 (KR) ........................ 10-2021-0003878

(51) Int. Cl.
*G06N 3/08* (2023.01)
*G06F 18/22* (2023.01)
(Continued)

(52) U.S. Cl.
CPC ............... *G06N 3/08* (2013.01); *G06F 18/22* (2023.01); *G06F 18/241* (2023.01); *G06N 3/045* (2023.01);
(Continued)

(58) Field of Classification Search
CPC ........ G06N 3/08; G06N 3/045; G06N 3/0464; G06N 3/0495; G06N 3/082; G06N 3/09;
(Continued)

(56) References Cited

U.S. PATENT DOCUMENTS 9,805,716 B2 10/2017 Lee et al.
11,195,056 B2 * 12/2021 Malaescu ................. G06N 3/08
(Continued)

OTHER PUBLICATIONS

Babak Ehteshami Bejnordi et al., "Batch-Shaping for Learning Conditional Channel Gated Networks", ICLR 2020, Apr. 3, 2020, pp. 1-14.
Brandon Yang et al., "CondConv: Conditionally Parameterized Convolutions for Effcient Inference", 33rd Conference on Neural Information Processing Systems, Sep. 4, 2020, Vancouver, Canada. arXiv:1904.04971v3.
Kitong Gao et al., "Dynamic Channel Pruning: Feature Boosting and Suppression", ICLR 2019, Jan. 28, 2019, pp. 1-14, arXiv:1810.05331v2.
(Continued)

*Primary Examiner* — Omar F Fernandez Rivas

(57) ABSTRACT

Provided are a method and system for training a dynamic deep neural network. The method for training a dynamic deep neural network includes receiving an output of a last layer of the deep neural network and outputting a first loss, receiving an output of a routing module according to an input class of the deep neural network and outputting a second loss, calculating a third loss based on the first loss and the second loss, and updating a weight of the deep neural network by using the third loss.

20 Claims, 8 Drawing Sheets

(51) Int. Cl.

| | |
|---|---|
| ***G06F 18/241*** | (2023.01) |
| ***G06N 3/045*** | (2023.01) |
| ***G06N 3/0464*** | (2023.01) |
| ***G06N 3/0495*** | (2023.01) |
| ***G06N 3/082*** | (2023.01) |
| ***G06N 3/084*** | (2023.01) |
| ***G06N 3/09*** | (2023.01) |
| ***G06V 10/776*** | (2022.01) |

(52) U.S. Cl.

CPC ......... *G06N 3/0464* (2023.01); *G06N 3/0495* (2023.01); *G06N 3/082* (2013.01); *G06N 3/084* (2013.01); *G06N 3/09* (2023.01); *G06V 10/776* (2022.01)

(58) Field of Classification Search

CPC ....... G06N 3/084; G06F 18/22; G06F 18/241; G06V 10/776; G06V 10/82

See application file for complete search history.

(56) References Cited

U.S. PATENT DOCUMENTS

| | | | | |
|---|---|---|---|---|
| 11,574,185 | B2 * | 2/2023 | Choi | G06N 3/045 |
| 11,615,303 | B2 * | 3/2023 | Park | G06N 3/045 706/20 |
| 11,875,250 | B1 * | 1/2024 | Xia | G06F 16/51 |
| 2017/0372201 | A1 * | 12/2017 | Gupta | G06N 20/00 |
| 2019/0188567 | A1 | 6/2019 | Yao et al. | |
| 2020/0302291 | A1 | 9/2020 | Hong | |
| 2021/0216747 | A1 * | 7/2021 | Rodyushkin | G06V 20/64 |

OTHER PUBLICATIONS

Yinpeng Chen et al., "Dynamic Convolution: Attention over Convolution Kernels", 2020, pp. 11030-11039.

Linfeng Zhang et al., "Be Your Own Teacher: Improve the Performance of Convolutional Neural Networks via Self Distillation," Computer Vision Foundation, Oct. 29, 2019, pp. 3713-3722.

* cited by examiner

1

2

2

3

METHOD AND SYSTEM FOR TRAINING DYNAMIC DEEP NEURAL NETWORK

CROSS-REFERENCE TO RELATED APPLICATION

This application claims priority to and the benefit of Korean Patent Application No. 10-2021-0003878 filed in the Korean Intellectual Property Office on Jan. 12, 2021, the entire contents of which are incorporated herein by reference.

BACKGROUND OF THE DISCLOSURE

(a) Field of the Disclosure

The present disclosure relates to a method and system for training a dynamic deep neural network.

(b) Description of the Related Art

A dynamic deep neural network may recognize contents of an input image by constructing a module, in which a linear filter and a nonlinear activation function are combined, in a multi-layered form in order to extract features. Many studies have been conducted not only on the problem of designing a network with high accuracy for the same data set, but also on the problem of designing a network with the highest accuracy in a limited amount of computation.

A dynamic network is a type of research that increases accuracy under the limited amount of computation. Unlike the existing network in which the same filter is used regardless of input data, the dynamic network is a network in which the filter used according to the input is changed, and enables more efficient calculation suitable for the input. That is, for example, there are training data on various breeds of dogs in ImageNet, but a filter for detailed classification of breeds of dogs will hardly play a role for car input images. Therefore, when the input is a car image, if the filter related to the classification of breeding of dogs may be removed from the calculation, the amount of computation may be reduced with little effect on the accuracy.

Such a dynamic network may be implemented by a channel gating or channel mixing method. The channel gating is a method in which some channels pass with a calculation and other channels pass without a calculation at an inference time. Since the channel gating performs the inference using only some channels of the network, the calculation cost may be saved. Meanwhile, the channel mixing is a method of generating a new filter set suitable for an input from a filter set trained at an inference time. Since the channel mixing also uses the small number of filters that condenses information of several filters, the calculation cost may be saved that much.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method and system for training a dynamic deep neural network in which, in the dynamic deep neural network, a routing module for determining importance of filters to be used for calculation in association with an input may be trained to select different filter sets for each input class.

An example embodiment of the present disclosure provides a method for training a dynamic deep neural network, including: receiving an output of a last layer of the deep neural network and outputting a first loss; receiving an output of a routing module according to an input class of the deep neural network and outputting a second loss; calculating a third loss based on the first loss and the second loss; and updating a weight of the deep neural network by using the third loss.

The outputting of the first loss may include: predicting the input class; and calculating a class determination loss for the prediction and outputting the first loss.

The outputting of the first loss may include outputting the first loss based on similarity to a ground truth class label.

The outputting of the second loss may include: generating one tensor by summing the outputs of the routing modules; predicting the input class based on the tensor; and calculating a class determination loss for the prediction and outputting the second loss.

The outputting of the second loss may include outputting the second loss based on similarity to the ground truth class label.

The calculating of the third loss may include calculating the third loss by the following equation.

$$\text{Third loss} = \text{first loss} + \lambda * \text{second loss} \quad \text{[Equation 1]}$$

Here, $\lambda$ is a hyper parameterfor determining a weight between the first loss and the second loss.

The method for training a dynamic deep neural network may further include: initializing all weights of the deep neural network; reading a training batch; and sequentially passing the training batch for all layers of the deep neural network.

The sequentially passing of the training batch may include generating a feature batch based on importance information of the filter after generating importance information of the filter using the routing module for each layer of the deep neural network.

The method for training a dynamic deep neural network may further include performing the method for training a dynamic deep neural network on a next training batch after updating the weight of the deep neural network.

The method for training a dynamic deep neural network may further include terminating the method for training a dynamic deep neural network when the next training batch does not exist.

Another embodiment of the present disclosure provides a method for training a dynamic deep neural network, including: receiving an output of a last layer of the deep neural network and outputting a first loss; receiving outputs of a first routing module and a second routing module according to an input class of the deep neural network, and outputting a second loss and a third loss; calculating a fourth loss based on the first loss and the second loss; and updating a weight of the deep neural network by using the fourth loss.

The outputting of the first loss may include: predicting the input class; and calculating a class determination loss for the prediction and outputting the first loss.

The outputting of the second loss may include: generating one first tensor by summing outputs of the first routing module of a first group; predicting the input class based on the first tensor; and a class determination loss for the prediction and outputting the second loss.

The outputting of the third loss may include: generating one second tensor by summing outputs of the second routing module of a second group; predicting the input class based on the second tensor; and calculating a class determination loss for the prediction and outputting the third loss.

The outputting of the second loss may include: predicting the input class based on the output of the first routing module; and calculating a class determination loss for the prediction and outputting the second loss.

The outputting of the third loss may include: predicting the input class based on the output of the second routing module; and calculating a class determination loss for the prediction and outputting the third loss.

Yet another embodiment of the present disclosure provides a system for training a dynamic deep neural network, including: a first loss output module receiving an output of a last layer of the deep neural network and outputting a first loss; a second loss output module receiving an output of a routing module according to an input class of the deep neural network and outputting a second loss; a loss calculation module calculating a third loss based on the first loss and the second loss; and a weight update module updating a weight of the deep neural network by using the third loss.

The first loss output module may include: a class prediction module predicting the input class; and a class determination loss module calculating a class determination loss for the prediction and outputting the first loss.

The second loss output module may include: a tenser merging module generating one tensor by summing the outputs of the routing modules; a class prediction module predicting the input class based on the tensor; and a class determination loss module calculating a class determination loss for the prediction and outputting the second loss.

The loss calculation module may calculate the third loss by the following equation 1.

$$\text{Third loss}=\text{first loss}+\lambda*\text{second loss} \quad \text{[Equation 1]}$$

Here, λ is a hyper parameterfor determining a weight between the first loss and the second loss.

DETAILED DESCRIPTION OF THE EMBODIMENTS

Figure 1:
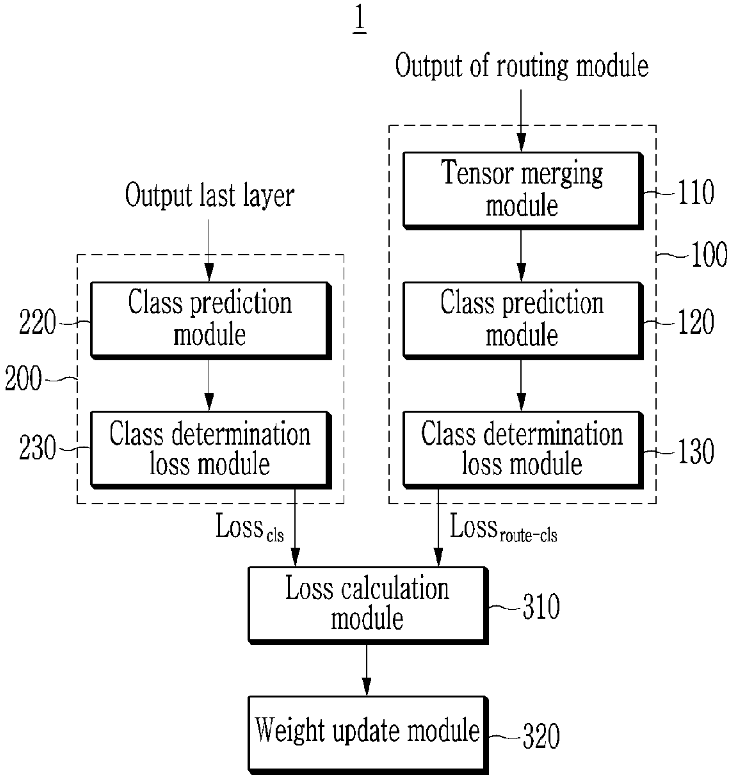
FIG. 1 is a block diagram for describing a system for training a dynamic deep neural network according to an example embodiment of the present disclosure.

Hereinafter, the present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

In addition, terms "~part", "~er/or", "module", or the like, described in the specification means a unit of processing at least one function or operation and may be implemented by hardware or software or a combination of hardware and software.

Figure 2:
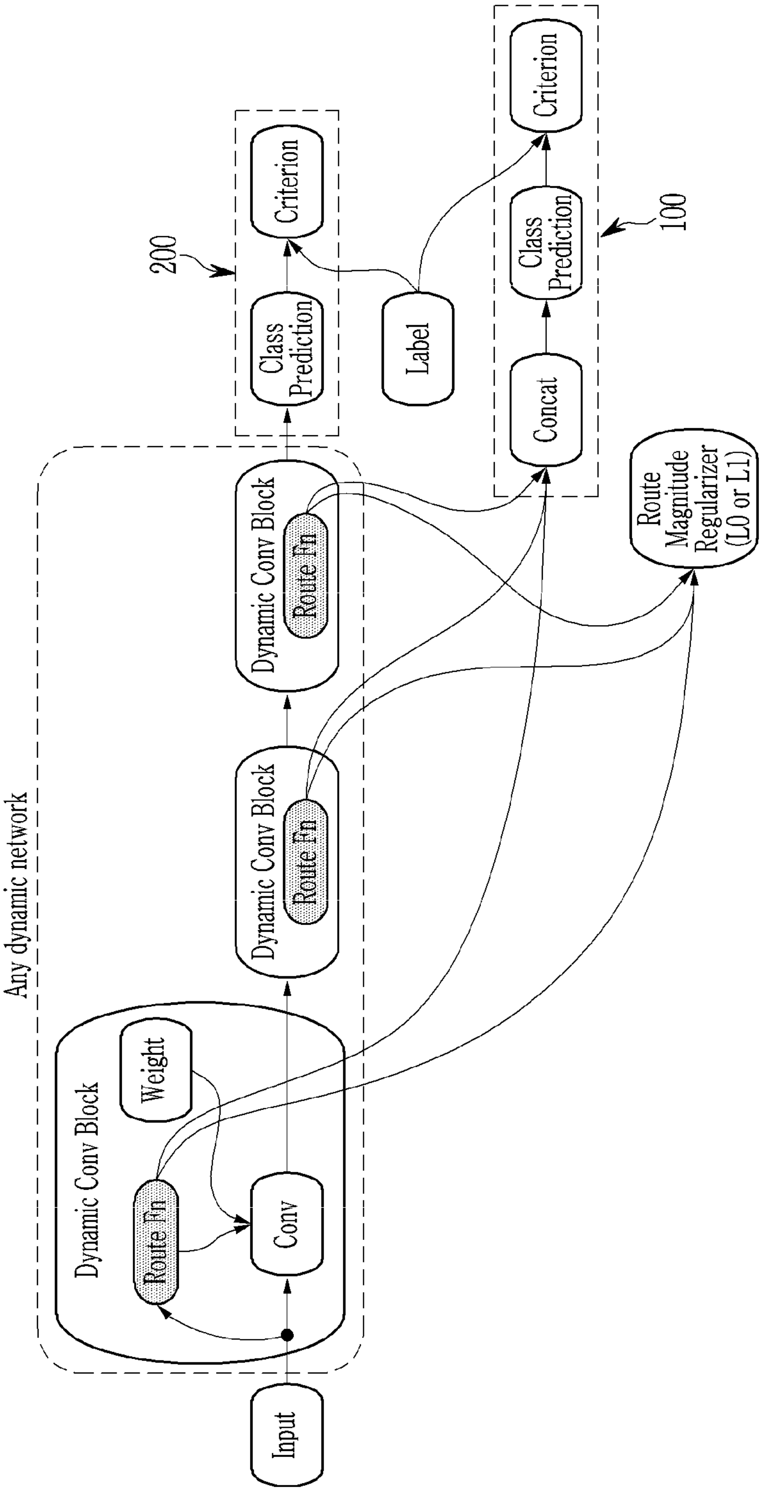
FIG. 2 is a diagram for describing a neural network structure in which the dynamic deep neural network is trained according to an example embodiment of the present disclosure.

FIG. 1 is a block diagram for describing a system for training a dynamic deep neural network according to an example embodiment of the present disclosure, and FIG. 2 is a diagram for describing a neural network structure in which the dynamic deep neural network is trained according to an example embodiment of the present disclosure.

Referring to FIGS. 1 and 2, the system 1 for training a dynamic deep neural network according to an example embodiment of the present disclosure may include a first loss output module 200, a second loss output module 100, a loss calculation module 310, and a weight update module 320.

The first loss output module 200 may receive an output of a last layer of the deep neural network and output a first loss ($Loss_{cls}$). To this end, the first loss output module 200 may include a class prediction module 220 and a class determination loss module 230. The class prediction module 220 and the class determination loss module 230 may correspond to "Class Prediction" and "Criterion" in a dotted line box referenced as 200 in FIG. 2.

The class prediction module 220 may predict an input class. Specifically, the class prediction module 200 may perform class prediction on an output that passes through a last layer by allowing an input of the deep neural network to pass through layers corresponding to dynamic convolution blocks of the deep neural network.

Here, the deep neural network may include any dynamic deep neural network, and a plurality of dynamic convolution blocks (Dynamic Cony Block) may be included in the deep neural network. Specifically, a weight that may be used for feature extraction, a routing module (Route Fn) for generating a weight to be used when inferring a current input among weights, and a convolution layer (Cony) composed of generated weights may constitute one dynamic convolution block. Such a plurality of such dynamic convolution blocks are connected to form the dynamic deep neural network.

The class determination loss module 230 may calculate a class determination loss for the prediction of the class prediction module 220 and output the first loss ($Loss_{cls}$). Specifically, the class determination loss module 230 may calculate a loss based on similarity between a prediction result of the class prediction module 220 and a ground truth class label (ground class label), and then output the result as the first loss ($Loss_{cls}$). In this case, "cross entropy loss" or the like may be used as the class determination loss calculation layer.

Meanwhile, the second loss output module 100 may receive an output of the routing module that generates importance information of a filter according to the input class of the deep neural network and output a second loss ($Loss_{route-cls}$). For example, the second loss output module 100 may receive the output of the routing module that generates a gating or mixing pattern according to the input class of the deep neural network and output the second loss ($Loss_{route-cls}$). To this end, the second loss output module 100 may include a tensor merging module 110, a class prediction module 120, and a class determination loss module 130. The tensor merging module 110, the class prediction module 120, and the class determination loss module 130 may correspond to "Concat", "Class Prediction" and "Criterion" in the dotted-line box referenced by 100 in FIG. 2.

The tensor merging module 110 may generate one tensor by summing the outputs of the routing modules. Specifically, for example, when three dynamic convolution blocks exist in the dynamic deep neural network, the tensor merging module 110 may receive outputs from all three routing modules included in each of the three dynamic convolution blocks, and then, sums these outputs to generate one tensor.

The class prediction module 120 may predict an input class based on the tensor generated by the tensor merging module 110. Specifically, the class prediction module 120 may perform the class prediction on all results output through the routing module from each of the layers corresponding to the dynamic convolution blocks of the deep neural network.

The class determination loss module 130 may calculate a class determination loss for the prediction of the class prediction module 120 and output the second loss ($Loss_{route-cls}$). Specifically, the class determination loss module 130 may calculate a loss based on the similarity between the prediction result of the class prediction module 120 and the ground truth class label, and then, output the result as the second loss ($Loss_{route-cls}$). In this case, "cross entropy loss" or the like may be used as the class determination loss calculation layer.

The loss calculation module 310 may calculate a third loss (Loss) based on the first loss ($Loss_{cls}$) output from the first loss output module 200 and the second loss ($Loss_{route-cls}$) output from the second loss output module 100.

Specifically, the loss calculation module 310 may calculate the third loss (Loss) by the following Equation 1.

$$\text{Third loss (Loss)}=\text{first loss }(Loss_{cls})+\lambda*\text{second loss }(Loss_{route-cls}) \quad \text{[Equation 1]}$$

Here, $\lambda$ is a hyper parameter for determining a weight between the first loss ($Loss_{cls}$) and the second loss ($Loss_{route-cls}$).

Then, the weight update module 320 may update the weight of the deep neural network by using the third loss (Loss).

According to the present example embodiment, when correcting the loss used in training the deep neural network, not only the class classification loss referenced by 200 in FIG. 2 is used, but the class classification loss according to the result of the routing module referenced by 100 in FIG. 1 is also taken into account. As a result, when a loss occurs due to a routing module pattern and is added to the existing class classification loss, parameters of the routing module may be trained so that each class may be classified by an output pattern of the routing module in a backpropagation process, and in accordance with an original meaning of a dynamic deep neural network in which filters are selected or synthesized to be suitable for each input, from a training stage, different filter sets for each input class can be used to the extent that an input class may be predicted by a routing module to further improve expressive power of the network, thereby increasing accuracy under the same amount of computation.

In the example embodiment, the class prediction module 220 and the class prediction module 120 may be implemented as a single layer or as a fully connected layer having a multi-layered structure.

Figure 3:
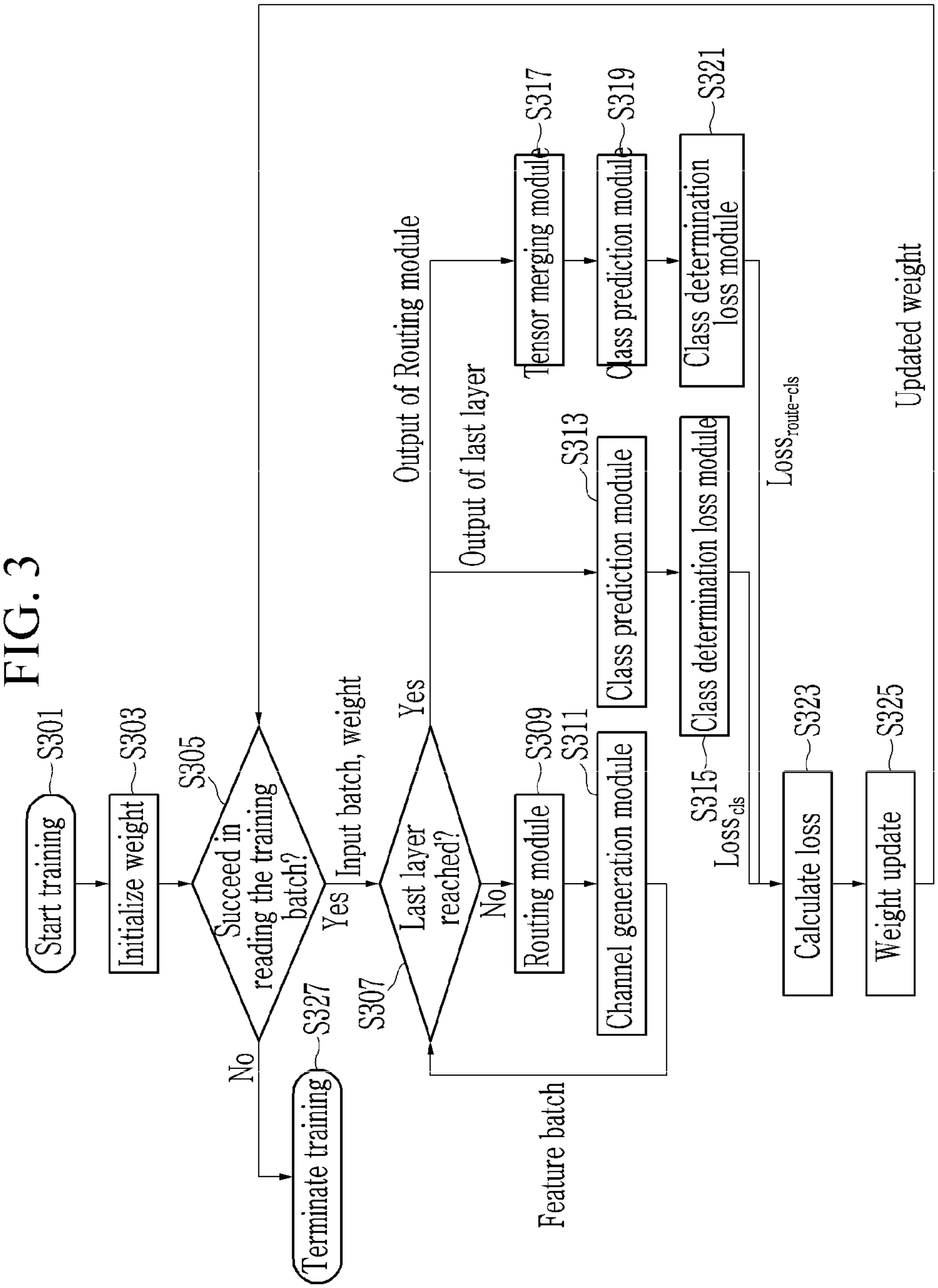
FIG. 3 is a diagram for describing a method for training a dynamic deep neural network according to an example embodiment of the present disclosure.

FIG. 3 is a diagram for describing a method for training a dynamic deep neural network according to an example embodiment of the present disclosure.

Referring to FIG. 3, the method for training a dynamic deep neural network according to an example embodiment of the present disclosure may include starting training S301. In step S301, training for any dynamic deep neural network as described with reference to FIGS. 1 and 2 may be started.

The method may include, after starting the training, initializing all weights of the deep neural network S303 and reading a training batch S305. When reading the training batch succeeds (S305, Yes), the process may proceed to steps S307, S309, and S311 of sequentially passing the training batch for all layers of the deep neural network. On the other hand, when it fails to read the training batch (S305, No) (for example, when a next training batch does not exist), the process may proceed to the step S327 of terminating the training of the dynamic deep neural network.

Steps S307, S309, and S311 of sequentially passing the training batch for all layers of the deep neural network may include a step S309 of generating importance information of the filter, for example, a gating or a mixing pattern for each layer of the deep neural network, by using the routing module, and then, a step S311 of generating a feature batch based on the importance information of the filter. The feature batch may be applied to a next layer.

Until the last layer is reached (S307, No), steps S309 and S311 are repeatedly performed, and after reaching the last layer (S307, Yes), the process proceeds to next steps.

Steps S313 and S315 may receive the output of the last layer of the deep neural network and output the first loss ($Loss_{cls}$).

Steps S313 and S315 may include a step of predicting an input class S313 and outputting the first loss ($Loss_{cls}$) by calculating the class determination loss for the prediction S315. Here, step S315 may include outputting the first loss ($Loss_{cls}$) based on the similarity with the ground truth class label.

Steps S317, S319, and S321 may receive the output of the routing module and output the second loss ($Loss_{route-cls}$).

Steps S317, S319, and S321 may include generating a single tensor by summing the outputs of the routing modules S317, predicting an input class based on the corresponding tensor S319, and calculating a class determination loss for the prediction and outputting the second loss ($Loss_{route-cls}$) S321. Here, step S321 may include outputting the second loss ($Loss_{route-cls}$) based on the similarity with the ground truth class label.

Step S323 may calculate the third loss (Loss) based on the first loss ($Loss_{cls}$) and the second loss ($Loss_{route-cls}$).

Specifically, in step S323, the third loss (Loss) may be calculated by the following Equation 1.

Third loss=first loss+λ*second loss [Equation 1]

Here, λ is a hyper parameterfor determining a weight between the first loss ($Loss_{cls}$) and the second loss ($Loss_{route-cls}$).

In step S325, the weight of the deep neural network may be updated using the third loss (Loss).

In the method, after step S325, in order to perform the learning of the dynamic deep neural network for the next training batch, the process may proceed to step S305 of reading the training batch based on the updated weight.

Figure 4:
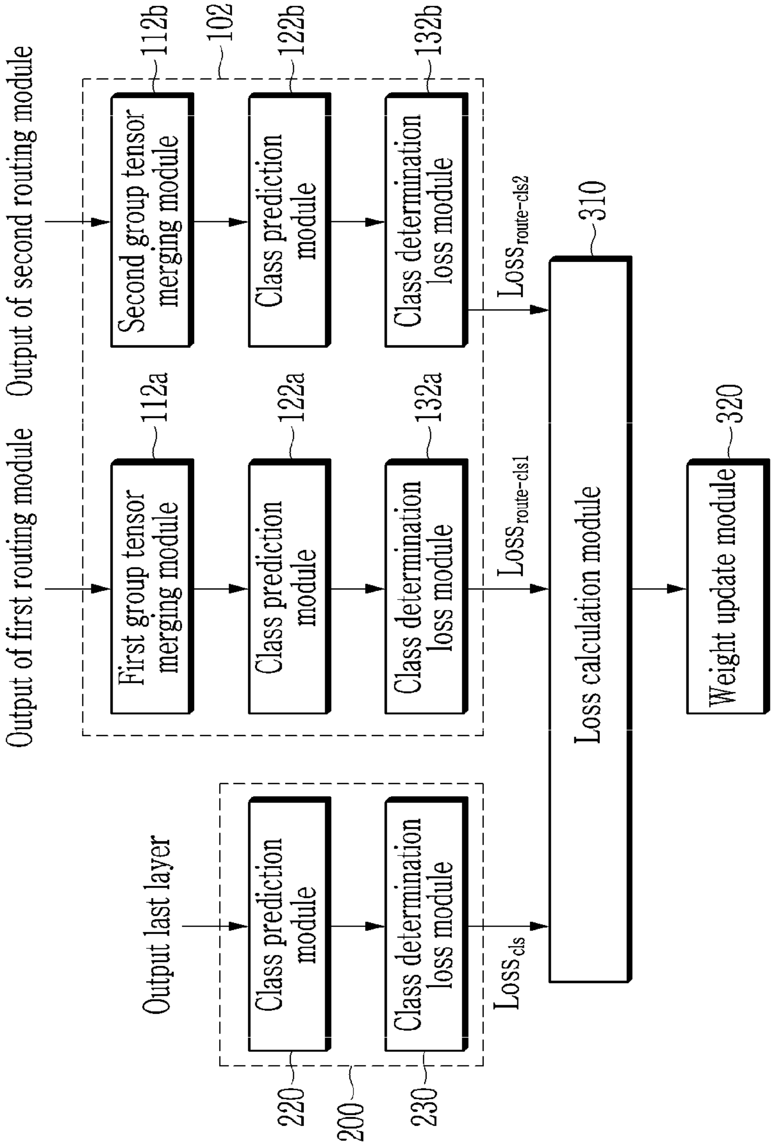
FIG. 4 is a block diagram for describing a system for training a dynamic deep neural network according to an example embodiment of the present disclosure.
Figure 5:
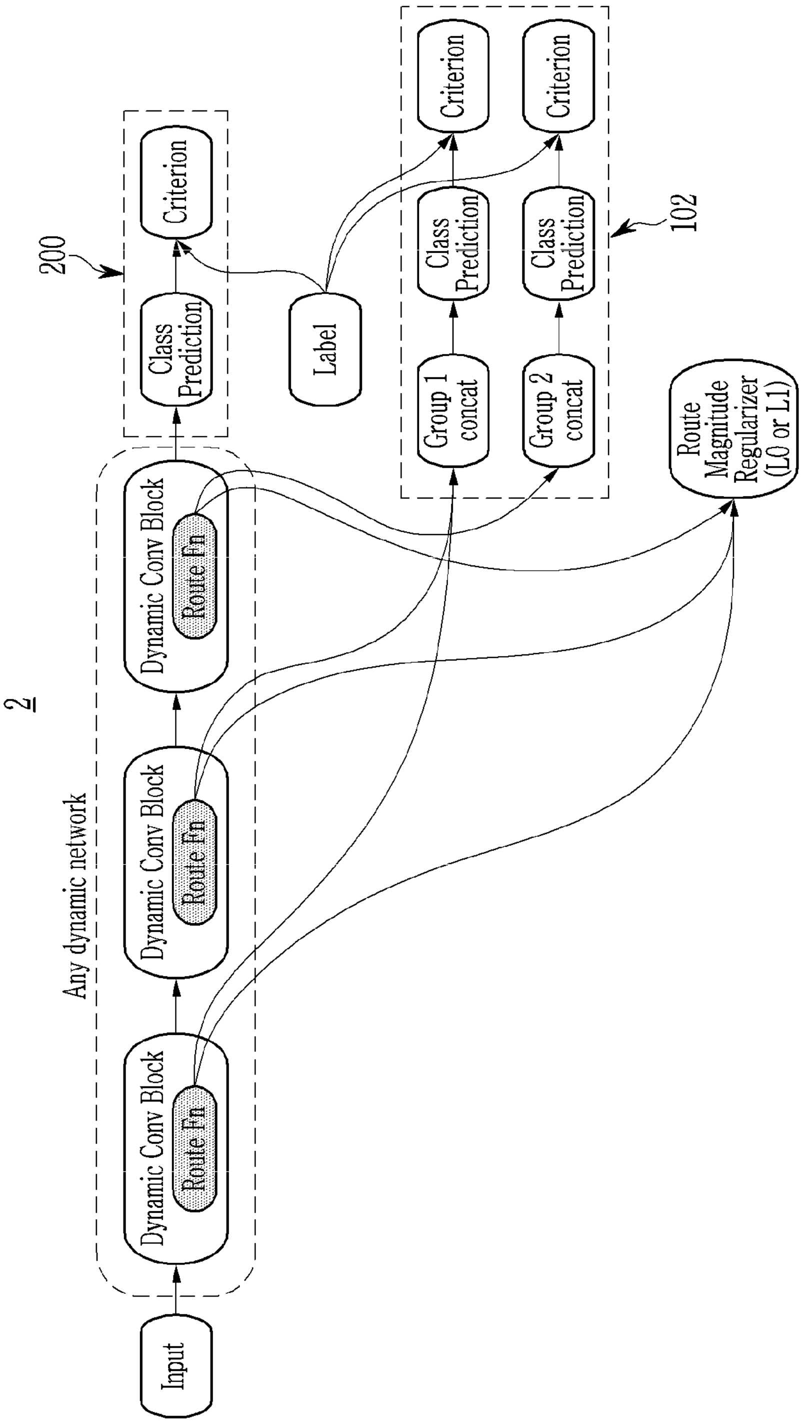
FIG. 5 is a diagram for describing a neural network structure in which the dynamic deep neural network is trained according to the example embodiment of the present disclosure.

FIG. 4 is a block diagram for describing a system for training a dynamic deep neural network according to an example embodiment of the present disclosure, and FIG. 5 is a diagram for describing a neural network structure in which the dynamic deep neural network is trained according to an example embodiment of the present disclosure.

Referring to FIGS. 4 and 5, the system 2 for training a dynamic deep neural network according to an embodiment of the present disclosure may include a first loss output module 200, a second loss output module 102, a loss calculation module 310, and a weight update module 320.

The first loss output module 200 may refer to the description of the first loss output module 200 of the system 1 for training a dynamic deep neural network described with reference to FIG. 1, and therefore, the overlapping description will be described.

The second loss output module 102 may include a plurality of group tensor merging modules 112*a* and 112*b*, a plurality of class prediction modules 122*a* and 122*b*, and a plurality of class determination loss modules 132*a* and 132*b*. Unlike the system 1 for training a dynamic deep neural network of FIG. 1, which generated one loss by merging the outputs of all the routing modules into one, in the system 2 for training a dynamic deep neural network, the outputs of the routing modules may merge the outputs of the routing modules into a certain group unit (e.g., block unit of resnet), and calculates the class prediction and class determination loss for each group, thereby calculating the loss separately.

To this end, the first group tensor merging module 112*a* may generate a tensor for the output of the first routing module (i.e., outputs of one or more routing modules belonging to the first group). Specifically, for example, when there are three dynamic convolution blocks in the dynamic deep neural network, the first group tensor merging module 112*a* may receive the outputs from the two routing modules included in each of the dynamic convolution blocks corresponding to the first and second layers and then sum these outputs, thereby generating one tensor.

Meanwhile, the second group tensor merging module 112*b* may generate a tensor for the output (i.e., outputs of one or more routing modules belonging to the second group) of the second routing module. Specifically, the second group tensor merging module 112*b* may receive an output from one routing module included in the dynamic convolution block corresponding to the third layer, and then, generate one tensor therefrom, in the dynamic deep neural network.

The tensor generated by the first group tensor merging module 112*a* passes through the class prediction module 122*a* and the class determination loss module 132*a*, and the second loss ($Loss_{route-cls}$) is output therefrom.

Meanwhile, the tensor generated by the second group tensor merging module 112*b* passes through the class prediction module 122*b* and the class determination loss module 132*b*, and the third loss ($Loss_{route-cls}$) is output therefrom.

The loss calculation module 310 may calculate a fourth loss (Loss) based on the first loss ($Loss_{cls}$) output from the first loss output module 200, the second loss ($Loss_{route-cls}$) output from the class determination loss module 132*a* among the second loss output modules 102, and the third loss ($Loss_{route-cls}$) output from the class determination loss module 132*b* among the second loss output modules 102.

Then, the weight update module 320 may update the weight of the deep neural network by using the fourth loss (Loss).

According to the present embodiment, since the loss is calculated in units of each group, training is performed to classify classes in units of each group. The present example embodiment is different from the previous example embodiment in that when the class classification is performed only with a part of the routing modules because the outputs of all the routing modules are merged, the class classification is performed only with the part, and the remaining routing modules do not receive a loss for classifying the class.

In a deep learning network, it is known that a global feature of an image is trained in the first half layers and a class specific feature is trained in the second half layer. In the configuration of the previous example embodiment, the second half layers are trained to be classified by class, but the first half layers may not be classified by class, while according to the configuration of the present example embodiment, the training proceeds so that both the first and second half layers are classified by class, so redundancy in all the layers may be reduced and various filters specialized for each class may be trained.

Figure 6:
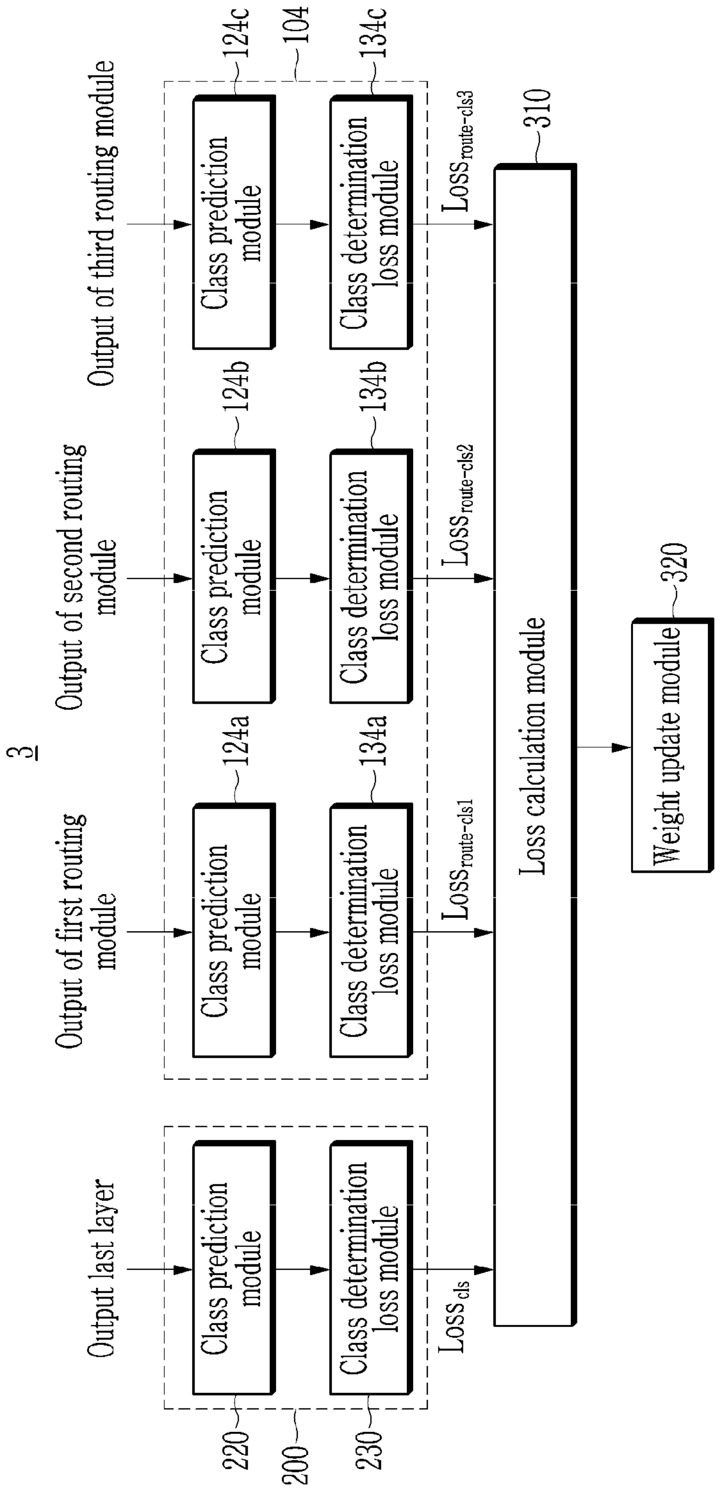
FIG. 6 is a block diagram for describing the system for training a dynamic deep neural network according to the example embodiment of the present disclosure.
Figure 7:
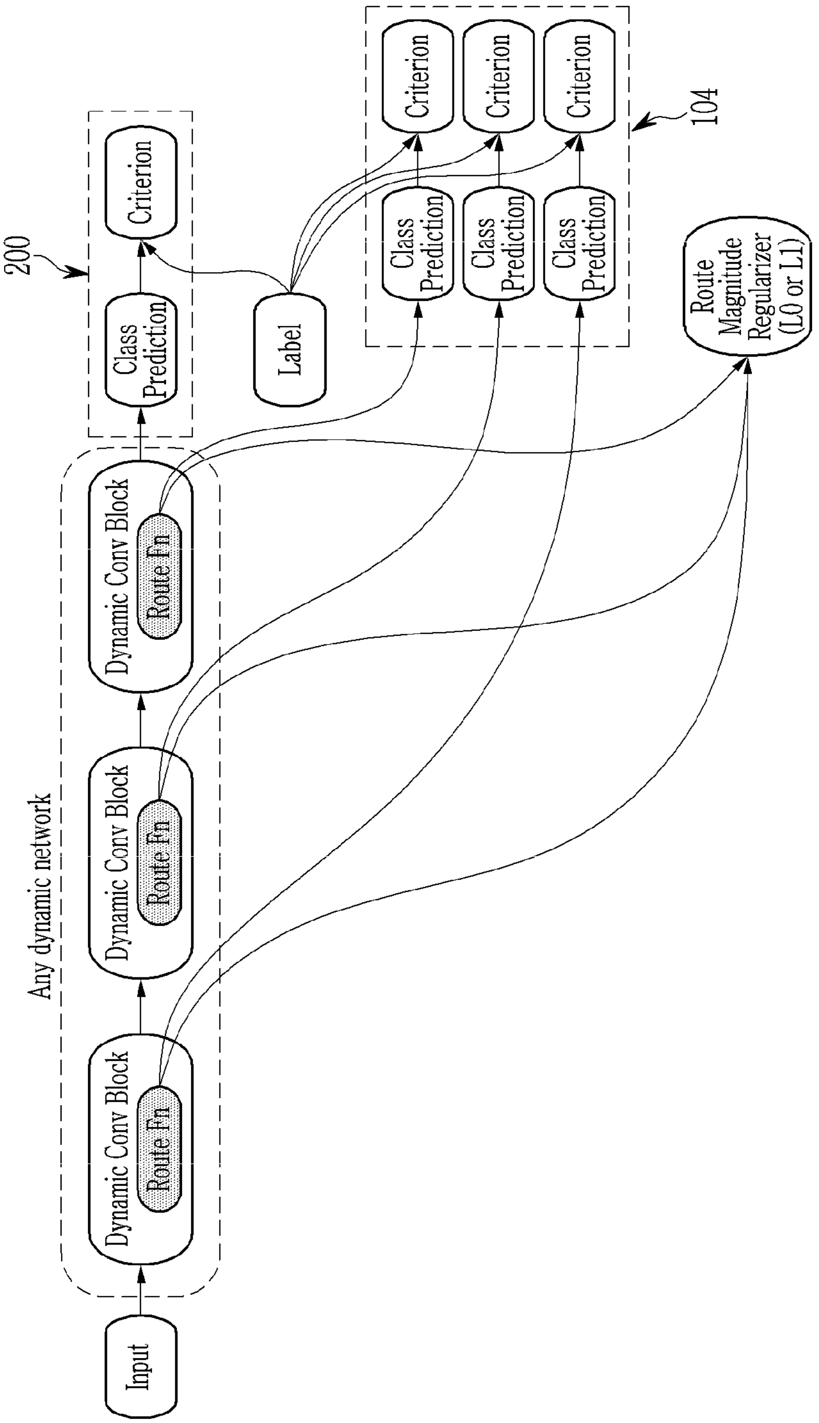
FIG. 7 is a diagram for describing the neural network structure in which the dynamic deep neural network is trained according to the example embodiment of the present disclosure.

FIG. 6 is a block diagram for describing a system for training a dynamic deep neural network according to an example embodiment of the present disclosure, and FIG. 7 is a diagram for describing a neural network structure in which the dynamic deep neural network is trained according to an example embodiment of the present disclosure.

Referring to FIGS. 6 and 7, the system 3 for training a dynamic deep neural network according to an example embodiment of the present disclosure may include a first loss output module 200, a second loss output module 104, a loss calculation module 310, and a weight update module 320.

The first loss output module 200 may refer to the description of the first loss output module 200 of the system 1 for training a dynamic deep neural network described with reference to FIG. 1, and therefore, the overlapping description will be described.

The second loss output module 102 may include a plurality of class prediction modules 124*a*, 124*b*, and 124*c* and a plurality of class determination loss modules 134*a*, 134*b*, 134*c*. Unlike the systems 1 and 2 for training a dynamic deep neural network described above, the system 3 for training a dynamic deep neural network may calculate class prediction and class determination loss individually without merging the outputs of the routing modules, thereby calculating the loss separately.

To this end, the class prediction module 124*a* predicts the input class based on the output of the first routing module, and the second loss ($Loss_{route-cls}$) passes through the class determination loss module 134*a*, and then, is output.

Meanwhile, the class prediction module 124*a* predicts the input class based on the output of the second routing module, and the third loss ($Loss_{route-cls}$) passes through the class determination loss module 134*b*, and then, is output.

Meanwhile, the class prediction module 124*c* predicts the input class based on the output of the third routing module, and the fourth loss ($Loss_{route\text{-}cls}$) passes through the class determination loss module 134*c*, and then, is output.

The loss calculation module 310 may calculate a fifth loss (Loss) based on the first loss ($Loss_{cls}$) output from the first loss output module 200, the second loss ($Loss_{route\text{-}cls}$) output from the class determination loss module 134*b* among the second loss output modules 102, the third loss ($Loss_{route\text{-}cls}$) output from the class determination loss module 134*b* among the second loss output modules 102, and the fourth loss ($Loss_{route\text{-}cls}$) output from the class determination loss module 134*c* among the second loss output modules 102.

Then, the weight update module 320 may update the weight of the deep neural network by using the fifth loss (Loss).

According to the present example embodiment, it has a configuration in which the outputs of all the routing modules are individually subjected to the class prediction and class loss determination to calculate the loss. In this case, no merging is necessary, and it is possible to perform the class classification of the outputs of all the routing modules, and train filters suitable for the class in all the layers.

According to the example embodiments of the present disclosure described so far, when a loss occurs due to a routing module pattern and is added to the existing class classification loss, parameters of the routing module may be trained so that each class may be classified by an output pattern of the routing module in a backpropagation process. Accordingly, in accordance with an original meaning of a dynamic deep neural network in which filters are selected or synthesized to be suitable for each input, from a training stage, different filter sets for each input class can be used to the extent that an input class may be predicted by a routing module to further improve expressive power of the network, thereby increasing accuracy under the same amount of computation.

In order to verify the effect of the disclosure, the following experiment was performed. A data set was CIFAR-10, a base network was resnet20, and the routing module used an attention module similar to squeeze-and-excite network (SENet). The results of measuring accuracy performance (top1 accuracy) while increasing a pruning ratio from 30% to 90% are shown in Table 1 below.

TABLE 1

| Pruning ratio | Existing method | Method according to the present disclosure | Difference |
|---|---|---|---|
| 30% | 0.9205 | 0.9225 | 0.0020 |
| 40% | 0.9143 | 0.9190 | 0.0047 |
| 50% | 0.9120 | 0.9126 | 0.0004 |
| 60% | 0.9040 | 0.9076 | 0.0036 |
| 70% | 0.8964 | 0.9021 | 0.0057 |
| 80% | 0.8860 | 0.8861 | 0.0001 |
| 90% | 0.8501 | 0.8603 | 0.0102 |

As can be seen from Table 1, it may be confirmed that the method according to the present disclosure at various pruning ratios has improved performance at the same amount of calculation compared to the existing method.

In addition, the results of comparing the difference in the accuracy performance between the existing method and the method according to the present disclosure while maintaining the overall number of filters similarly by adjusting the pruning ratio while increasing the total number of channels by increasing a width-multiplier are as shown in Table 2 below.

TABLE 2

| Width-multiplier | Pruning ratio | Existing method | Method according to the present disclosure | Difference |
|---|---|---|---|---|
| 1 | 0.0% | 0.9301 | 0.9305 | 0.0004 |
| 2 | 50.0% | 0.9400 | 0.9412 | 0.0012 |
| 4 | 75.0% | 0.9450 | 0.9462 | 0.0012 |
| 8 | 87.5% | 0.9470 | 0.9507 | 0.0037 |

As can be seen from Table 2, it can be seen that the proposed method shows higher accuracy than the existing method even when the pruning ratio (and) width-multiplier is changed together.

Figure 8:
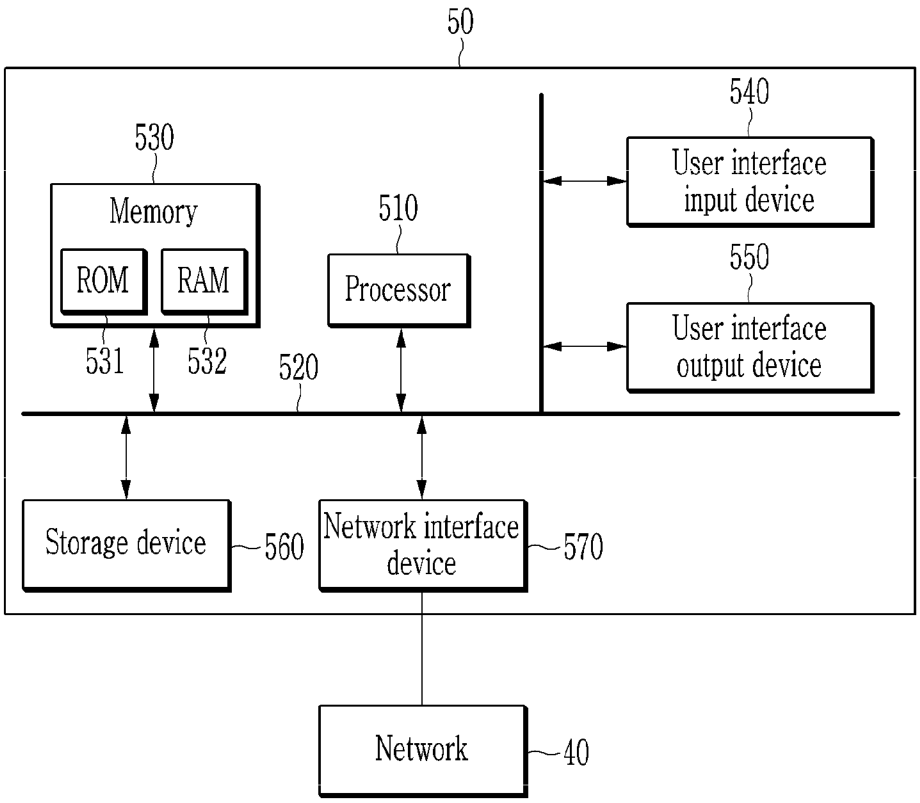
FIG. 8 is a block diagram for describing a computing device for implementing a method and system for training a dynamic deep neural network according to example embodiments of the present disclosure.

FIG. 8 is a block diagram for describing a computing device for implementing a method and system for training a dynamic deep neural network according to embodiments of the present disclosure.

Referring to FIG. 8, a method and system for training a dynamic deep neural network according to example embodiments of the present disclosure may be implemented using a computing device 50.

The computing device 50 may include at least one of a processor 510, a memory 530, a user interface input device 540, a user interface output device 550, and a storage device 560 in communication via a bus 520. The computing device 50 may also include a network interface 570 electrically connected to network 40, such as a wireless network. The network interface 570 may transmit or receive signals with other entities through the network 40.

The processor 510 may be implemented in various types such as an application processor (AP), a central processing unit (CPU), a graphics processing unit (GPU), and the like, and may be any semiconductor device that executes a command stored in the memory 530 or the storage device 560. The processor 510 may be configured to implement functions and methods described with reference to FIGS. 1 to 7.

The memory 530 and the storage device 560 may include various types of volatile or non-volatile storage media. For example, the memory may include a read-only memory (ROM) 531 and a random access memory (RAM) 532. In an example embodiment of the present disclosure, the memory 530 may be located inside or outside the processor 510, and the memory 530 may be connected to the processor 510 through various known means.

In addition, at least a part of the method and system for training a dynamic deep neural network according to example embodiments of the present disclosure may be implemented as a program or software executed in the computing device 50, and the program or software may be stored in a computer-readable medium.

In addition, at least some of the method and system for training a dynamic deep neural network according to example embodiments of the present disclosure may be implemented as hardware that may be electrically connected to the computing device 50.

According to embodiments of the present disclosure, outputs of routing modules in a dynamic deep neural network passes through a trainable neural network, so the routing modules are trained to classify an input class. That is, when a loss occurs due to a routing module pattern and is added to the existing class classification loss, parameters of the routing module may be trained so that each class may be classified by an output pattern of the routing module in a backpropagation process. Accordingly, in accordance with an original meaning of a dynamic deep neural network in which filters are selected or synthesized to be suitable for each input, from a training stage, different filter sets for each input class can be used to the extent that an input class may be predicted by a routing module to further improve expressive power of the network, thereby increasing accuracy under the same amount of computation.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

Although the example embodiment of the present disclosure has been described in detail hereinabove, the scope of the present disclosure is not limited thereto. That is, several modifications and alterations made by a person of ordinary skill in the art using a basic concept of the present disclosure as defined in the claims fall within the scope of the present disclosure.

What is claimed is:

1. A method for training a dynamic deep neural network, the method comprising:

providing the dynamic deep neural network with a plurality of dynamic convolution blocks, each dynamic convolution block including a routing module configured to generate filter importance information for determining which filters to apply to a current input;

receiving an output of a last layer of the deep neural network and outputting a first loss through a first classification path;

receiving an output of the routing module from at least one of the dynamic convolution blocks according to an input class of the deep neural network and outputting a second loss through a second classification path separate from the first classification path;

calculating a third loss based on the first loss and the second loss, wherein the third loss trains the routing module to select different filter sets for different input classes; and updating a weight of the deep neural network by using the third loss.

2. The method of claim 1, wherein:

the outputting of the first loss includes:

predicting the input class; and calculating a class determination loss for the prediction and outputting the first loss.

3. The method of claim 2, wherein:

the outputting of the first loss includes outputting the first loss based on similarity to a ground truth class label.

4. The method of claim 1, wherein:

the outputting of the second loss includes:

generating one tensor by summing the outputs of the routing modules;

predicting the input class based on the tensor; and calculating a class determination loss for the prediction and outputting the second loss.

5. The method of claim 4, wherein:

the outputting of the second loss includes outputting the second loss based on similarity to the ground truth class label.

6. The method of claim 1, wherein:

the calculating of the third loss includes calculating the third loss by the following equation $$\text{Third loss} = \text{first loss} + \lambda * \text{second loss} \quad \text{[Equation 1]}$$

Here, λ is a hyper parameter for determining a weight between the first loss and the second loss.

7. The method of claim 1, further comprising:

initializing all weights of the deep neural network;

reading a training batch; and sequentially passing the training batch for all layers of the deep neural network.

8. The method of claim 7, wherein:

the sequentially passing of the training batch includes generating a feature batch based on filter importance information after generating the filter importance information using the routing module for each layer of the deep neural network.

9. The method of claim 7, further comprising:

performing the method of training a dynamic deep neural network on a next training batch after updating the weight of the deep neural network.

10. The method of claim 9, further comprising:

terminating the method for training a dynamic deep neural network when the next training batch does not exist.

11. A method for training a dynamic deep neural network, the method comprising:

providing the dynamic deep neural network with a plurality of dynamic convolution blocks with integrated routing modules;

receiving an output of a last layer of the deep neural network and outputting a first loss;

receiving outputs of a first routing module within a first dynamic convolution block and a second routing module within a second dynamic convolution block according to an input class of the deep neural network, and outputting a second loss and a third loss through respective classification paths;

calculating a fourth loss based on the first loss, the second loss, and the third loss; and updating a weight of the deep neural network by using the fourth loss to enable class-specific filter selection by the routing modules.

12. The method of claim 11, wherein:

the outputting of the first loss includes:

predicting the input class; and calculating a class determination loss for the prediction and outputting the first loss.

13. The method of claim 11, wherein:

the outputting of the second loss includes:

generating one first tensor by summing outputs of the first routing module of a first group;

predicting the input class based on the first tensor; and calculating a class determination loss for the prediction and outputting the second loss.

14. The method of claim 13, wherein:

the outputting of the third loss includes:

generating one second tensor by summing outputs of the second routing module of a second group;

predicting the input class based on the second tensor; and calculating a class determination loss for the prediction and outputting the third loss.

15. The method of claim 11, wherein:

the outputting of the second loss includes:

predicting the input class based on the output of the first routing module; and calculating a class determination loss for the prediction and outputting the second loss.

16. The method of claim 15, wherein:

the outputting of the third loss includes:

predicting the input class based on the output of the second routing module; and calculating a class determination loss for the prediction and outputting the third loss.

17. A system for training a dynamic deep neural network, the system comprising:

one or more processors configured to execute specialized neural network training operations for the dynamic deep neural network, wherein the dynamic deep neural network includes a plurality of dynamic convolution blocks, each dynamic convolution block including a routing module that generates filter importance information for determining which filters to apply to a current input;

a first loss output module implemented as a first classification path receiving an output of a last layer of the deep neural network and outputting a first loss;

a second loss output module implemented as a second classification path separate from the first classification path, receiving an output of a routing module that generates filter importance information within a dynamic convolution block according to an input class of the deep neural network and outputting a second loss;

a loss calculation module calculating a third loss based on the first loss and the second loss; and a weight update module updating a weight of the deep neural network by using the third loss to train the routing module for class-specific filter selection.

18. The system of claim 17, wherein:

the first loss output module includes:

a class prediction module predicting the input class; and a class determination loss module calculating a class determination loss for the prediction and outputting the first loss.

19. The system of claim 17, wherein:

the second loss output module includes:

a tenser merging module generating one tensor by summing the outputs of the routing modules;

a class prediction module predicting the input class based on the tensor; and a class determination loss module calculating a class determination loss for the prediction and outputting the second loss.

20. The system of claim 17, wherein:

the loss calculation module calculates the third loss by the following equation 1

$$\text{Third loss} = \text{first loss} + \lambda * \text{second loss} \quad \text{[Equation 1]}$$

Here, λ is a hyper parameter for determining a weight between the first loss and the second loss.

* * * * *